(12) United States Patent
Kim et al.

(10) Patent No.: US 10,895,772 B2
(45) Date of Patent: Jan. 19, 2021

(54) LIQUID CRYSTAL SOLUTION, LIQUID CRYSTAL DISPLAY DEVICE INCLUDING LIQUID CRYSTAL SOLUTION AND METHOD OF FABRICATING THE SAME

(71) Applicant: LG DISPLAY CO., LTD., Seoul (KR)

(72) Inventors: Kyeong-Jin Kim, Goyang-si (KR); Kyung-Su Ha, Gwangju (KR); Eun-Woo Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 233 days.

(21) Appl. No.: 15/582,135

(22) Filed: Apr. 28, 2017

(65) Prior Publication Data
US 2017/0315388 A1  Nov. 2, 2017

(30) Foreign Application Priority Data
Apr. 28, 2016  (KR) ................ 10-2016-0052502

(51) Int. Cl.
*G02F 1/1334* (2006.01)
*B01J 13/16* (2006.01)
*C09K 19/54* (2006.01)
*G02F 1/1341* (2006.01)
(Continued)

(52) U.S. Cl.
CPC ............ *G02F 1/1334* (2013.01); *B01J 13/16* (2013.01); *C09K 19/544* (2013.01); *G02F 1/1341* (2013.01); *G02F 1/1368* (2013.01); *C09K 2019/523* (2013.01); *G02F 2201/121* (2013.01); *G02F 2201/123* (2013.01); *G02F 2202/023* (2013.01); *G02F 2202/36* (2013.01); *G02F 2203/64* (2013.01)

(58) Field of Classification Search
CPC . G02F 1/1334; G02F 2202/36; C09K 19/544; C09K 19/00; B01J 13/00
See application file for complete search history.

(56) References Cited

U.S. PATENT DOCUMENTS

| | | |
|---|---|---|
| 5,976,405 A | 11/1999 | Clikeman et al. |
| 2012/0105743 A1* | 5/2012 | Kaifu ............... G03B 17/17 349/2 |

(Continued)

FOREIGN PATENT DOCUMENTS

| | | |
|---|---|---|
| CN | 101281317 A | 10/2008 |
| CN | 102466912 A | 5/2012 |

(Continued)

*Primary Examiner* — Michael H Caley
*Assistant Examiner* — Jonathan Y Jung
(74) *Attorney, Agent, or Firm* — Birch, Stewart, Kolasch & Birch, LLP

(57) ABSTRACT

A liquid crystal display device includes: a substrate; a thin film transistor in a pixel region over the substrate; a common electrode over the thin film transistor; a pixel electrode connected to the thin film transistor; and a liquid crystal layer including a plurality of liquid crystal capsules over the common electrode and the pixel electrode, wherein each of the plurality of liquid crystal capsules includes a shell and a core having a plurality of liquid crystal molecules therein, and wherein a gap distance between the liquid crystal molecules in adjacent liquid crystal capsules is equal to or greater than 20 nm and equal to or smaller than 0.3 times of a capsule diameter of the adjacent liquid crystal capsules.

11 Claims, 8 Drawing Sheets

(51) Int. Cl.
*G02F 1/1368* (2006.01)
*C09K 19/52* (2006.01)

(56) References Cited

U.S. PATENT DOCUMENTS

| | | | |
|---|---|---|---|
| 2012/0113362 A1* | 5/2012 | Lim | G02F 1/1323 |
| | | | 349/96 |
| 2014/0184984 A1* | 7/2014 | Kim | G02F 1/134363 |
| | | | 349/61 |
| 2015/0109547 A1* | 4/2015 | Kim | G02F 1/133528 |
| | | | 349/12 |
| 2016/0091727 A1 | 3/2016 | Yoon et al. | |

FOREIGN PATENT DOCUMENTS

| | | | | | |
|---|---|---|---|---|---|
| CN | 103913880 A | | 7/2014 | | |
| EP | 0 088 126 B1 | | 1/1991 | | |
| EP | 16165174.0 | * | 4/2016 | | |
| WO | WO2017178419 | * | 4/2017 | ............. | C09K 19/18 |
| WO | WO 2017178419 | * | 10/2017 | | |
| WO | WO-2017178419 A1 | * | 10/2017 | ............. | C09K 19/52 |

* cited by examiner

LIQUID CRYSTAL SOLUTION, LIQUID CRYSTAL DISPLAY DEVICE INCLUDING LIQUID CRYSTAL SOLUTION AND METHOD OF FABRICATING THE SAME

CROSS-REFERENCE TO RELATED APPLICATIONS

The present application claims the benefit of priority of Korean Patent Application No. 10-2016-0052502 filed in the Republic of Korea on Apr. 28, 2016, which is hereby incorporated by reference in its entirety for all purposes as if fully set forth herein.

BACKGROUND OF THE INVENTION

Field of the Invention

The present disclosure relates to a liquid crystal display device, and more particularly to a liquid crystal display device including a liquid crystal layer of a liquid crystal capsule and a method of fabricating the same.

Description of the Related Art

Recently, as the information age progresses, display devices processing and displaying a large amount of information have rapidly advanced. For example, various flat panel displays (FPDs) having a thin profile, a light weight and a low power consumption have been researched.

As a result, a thin film transistor liquid crystal display (TFT-LCD) having an excellent color reproducibility and a thin profile has been developed. The LCD device displays an image using an optical anisotropy and a polarization property of a liquid crystal molecule.

The LCD device includes first and second substrates facing and spaced apart from each other and a liquid crystal layer between the first and second substrates. Since the LCD device includes two glass substrates, a weight and a thickness of the LCD device increases and it is not easy to apply the LCD device to a flexible display device.

To improve the above disadvantage, an LCD device including a liquid crystal layer having liquid crystal capsules has been suggested. The liquid crystal layer having the liquid crystal capsules may be formed through a coating method.

FIG. 1 is cross-sectional view showing a LCD device including a liquid crystal capsule according to the related art. In FIG. 1, a related art LCD device 10 includes a substrate 20 and a liquid crystal layer 42 on the substrate 20. The liquid crystal layer 42 includes a binder 44 and liquid crystal capsules 46 dispersed in the binder 44.

When a size (a diameter) of each of the liquid crystal capsules 46 is smaller than a wavelength of a visible ray, an optical change will not occur such as a scattering due to a refractive index difference between the binder 44 and the liquid crystal capsules 46. As a result, an optical property such as a transmittance of the LCD device 10 is improved.

When the liquid crystal capsules 46 are dispersed in the binder 44, a particle agglomeration A of the liquid crystal capsules 46 may be caused. When a size of the liquid crystal capsules in the particle agglomeration A (an average diameter of the particle agglomeration A) is greater than a wavelength of a visible ray, a scattering may occur.

Next, FIG. 2 is a view showing a scattering due to a particle agglomeration of a related art LCD device including a liquid crystal capsule shown in FIG. 1. In FIG. 2, when a size of the liquid crystal capsules 46 in the particle agglomeration A is greater than a wavelength of a visible ray, a scattering occurs as a white spot B of the LCD device 10. Since a black level of the LCD device 10 increases due to the white spot B, a contrast ratio of the LCD device 10 is reduced.

FIG. 3 is a view showing a transmittance-voltage (TV) curve of a related art LCD device including a liquid crystal capsule shown in FIG. 1. In FIG. 3, the liquid crystal capsule 46 in the liquid crystal layer 42 of the LCD device 10 of a first sample s1 has a first shell thickness, and the liquid crystal capsule 46 in the liquid crystal layer 42 of the LCD device 10 of a second sample s2 has a second shell thickness greater than the first shell thickness.

For the first sample s1, although a maximum transmittance of a white level has an excellent value of about 90%, a minimum transmittance of a black level increases to a value of about 5.1% due to the frequent particle agglomeration A. For the second sample s2, although a minimum transmittance of a black level has an excellent value of about 1.5% due to the rare particle agglomeration, a maximum transmittance of a white level decreases to a value of about 70%.

In the LCD device 10 including a liquid crystal capsule according to the related art, since the liquid crystal capsules 46 are not uniformly dispersed in the binder 44, the particle agglomeration A occurs. Since the particle agglomeration A is expressed as the white spot B, the black level increases and the contrast ratio is reduced.

Although a dispersion condition such as a surface modification of the liquid crystal capsule 46, the optimum binder 44 and the introduction of an additive is required for improving the black level and the contrast ratio, there exists a limit for obtaining the optimum dispersion condition.

SUMMARY OF THE INVENTION

Accordingly, the present disclosure is directed to an LCD device including a liquid crystal capsule and a method of fabricating the same that substantially obviate one or more of problems due to limitations and disadvantages of the prior art.

In accordance with the present disclosure, as embodied and broadly described herein, the present disclosure provides a liquid crystal layer including a binder; and a plurality of liquid crystal capsules dispersed in the binder, wherein each of the plurality of liquid crystal capsules includes a shell and a core having a plurality of liquid crystal molecules therein, and wherein a gap distance between the liquid crystal molecules in adjacent liquid crystal capsules is equal to or greater than 20 nm and equal to or smaller than 0.3 times of a capsule diameter of the adjacent liquid crystal capsules.

In another aspect, the present disclosure provides a liquid crystal display device including: a substrate; a thin film transistor in a pixel region over the substrate; a common electrode over the thin film transistor; a pixel electrode connected to the thin film transistor; and a liquid crystal layer including a plurality of liquid crystal capsules over the common electrode and the pixel electrode, wherein each of the plurality of liquid crystal capsules includes a shell and a core having a plurality of liquid crystal molecules therein, and wherein a gap distance between the liquid crystal molecules in adjacent liquid crystal capsules is equal to or greater than 20 nm and equal to or smaller than 0.3 times of a capsule diameter of the adjacent liquid crystal capsules.

In another aspect, the present disclosure provides a method of fabricating a liquid crystal display device including: forming a thin film transistor in a pixel region on a substrate; forming a common electrode over the substrate; forming a pixel electrode connected to the thin film transistor; and forming a liquid crystal layer including a plurality of liquid crystal capsules over the common electrode and the pixel electrode, wherein each of the plurality of liquid crystal capsules includes a shell and a core having a plurality of liquid crystal molecules therein, and wherein a gap distance between the liquid crystal molecules in adjacent liquid crystal capsules is equal to or greater than 20 nm and equal to or smaller than 0.3 times of a capsule diameter of the adjacent liquid crystal capsules.

It is to be understood that both the foregoing general description and the following detailed description are exemplary and explanatory and are intended to provide further explanation of the embodiments as claimed.

BRIEF DESCRIPTION OF THE DRAWINGS

The accompanying drawings, which are included to provide a further understanding of the disclosure and are incorporated in and constitute a part of this specification, illustrate embodiments and together with the description serve to explain the principles of the disclosure. In the drawings.

DETAILED DESCRIPTION OF THE PREFERRED EMBODIMENTS

Reference will now be made in detail to the present disclosure, examples of which are illustrated in the accompanying drawings. In particular, FIGS. 4A and 4B are cross-sectional views showing a black state and a white state, respectively, of an LCD device including a liquid crystal capsule according to an embodiment of the present disclosure.

Figure 1:
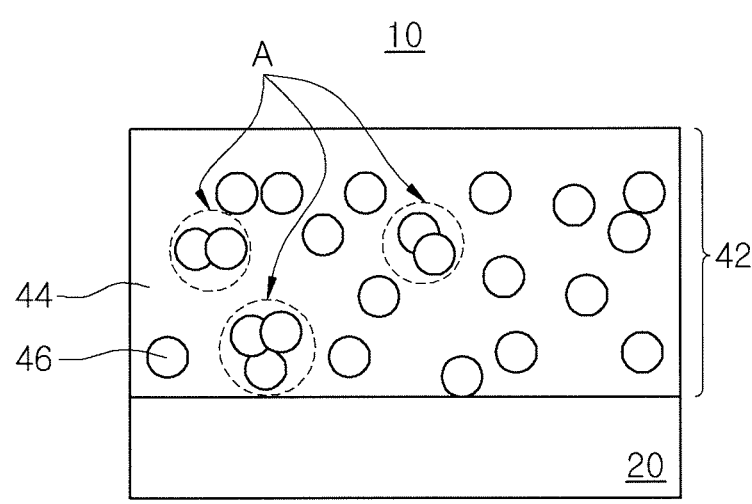
FIG. 1 is cross-sectional view showing a related art LCD device including a liquid crystal capsule.
Figure 2:
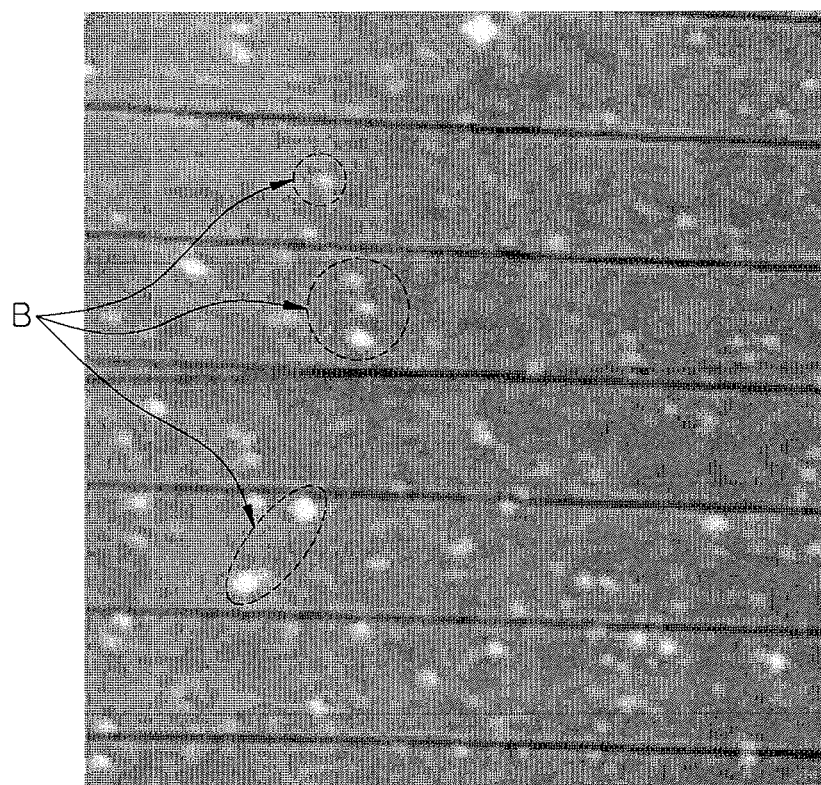
FIG. 2 is a view showing a scattering due to a particle agglomeration of the related art LCD device including a liquid crystal capsule shown in FIG. 1.
Figure 3:
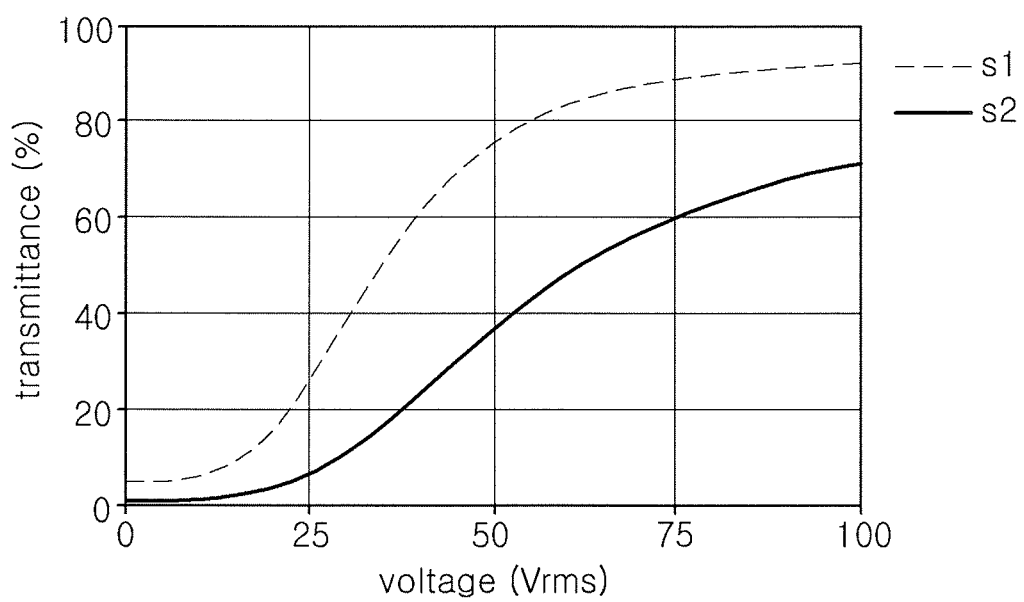
FIG. 3 is a view showing a transmittance-voltage (TV) curve of the related art LCD device including a liquid crystal capsule shown in FIG. 1.
Figure 4A:
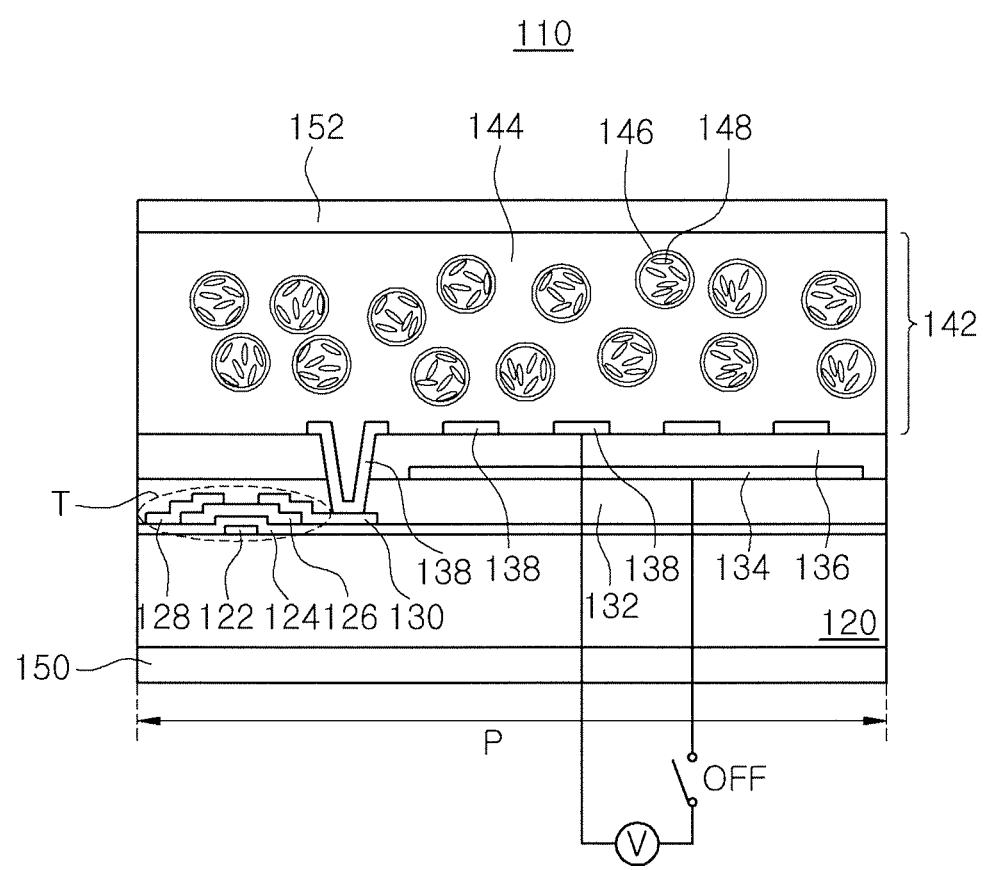
FIGS. 4A and 4B are cross-sectional views showing a black state and a white state, respectively, of an LCD device including a liquid crystal capsule according to an embodiment of the present disclosure.
Figure 4B:
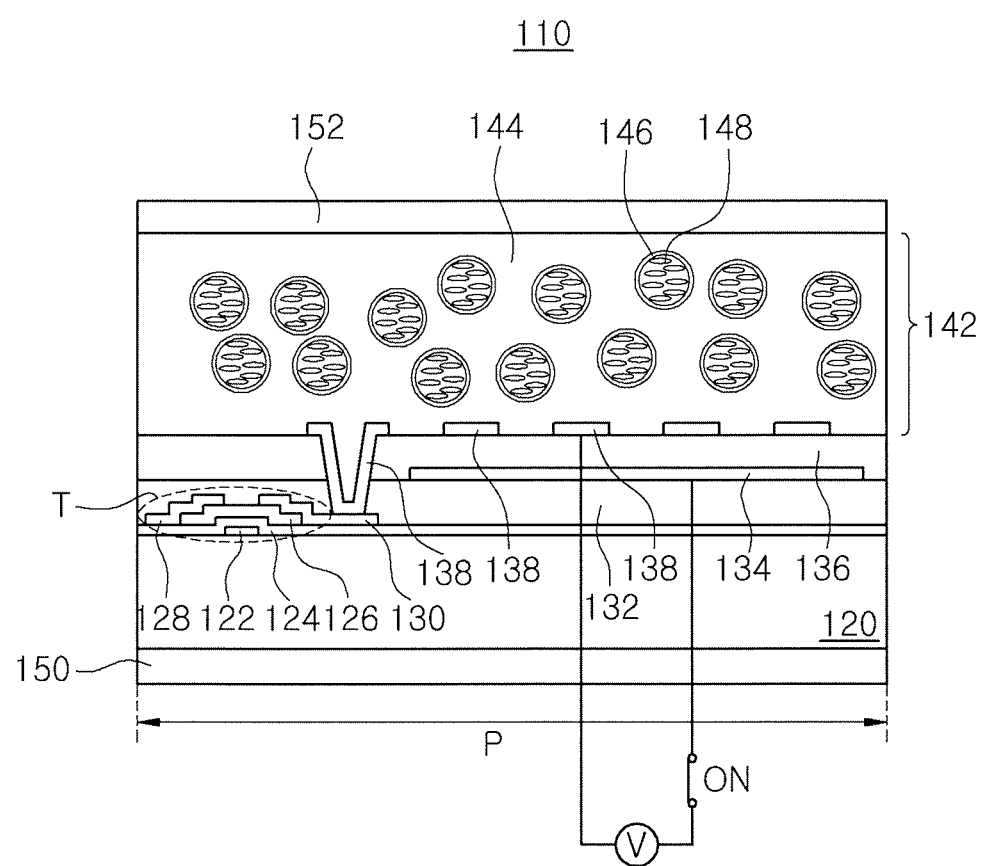

In FIGS. 4A and 4B, a LCD device 110 includes a substrate 120 where a thin film transistor (TFT) T, a common electrode 134 and a pixel electrode 138, and a liquid crystal layer 142 are formed. A gate electrode 122 is formed in each pixel region P on the substrate 120, and a gate insulating layer 124 is formed on a whole of the gate electrode 122 over the substrate 120. In addition, a semiconductor 126 is formed on the gate insulating layer 124 corresponding to the gate electrode 122, and a source electrode 128 and a drain electrode 130 are formed on both end portions of the semiconductor layer 126. The gate electrode 122, the semiconductor layer 126, the source electrode 128 and the drain electrode 130 constitute the TFT T.

Further, a gate line and a data line are formed on the substrate 120 and the TFT T is connected to the gate line and the data line. The gate line and the data line cross to define the pixel region P. Also, an interlayer insulating layer 132 is formed on a whole of the TFT T over the substrate 120, and the common electrode 134 is formed in the pixel region P on the interlayer insulating layer 132. For example, the common electrode 134 may be disposed to be spaced apart from a portion directly on the TFT T or may be disposed to be spaced apart from the portion directly on the TFT T and to partially overlap the TFT T.

In addition, a passivation layer 136 is formed on a whole of the common electrode 134 over the substrate 120, and the pixel electrode 138 is formed in the pixel region P on the passivation layer 136. The interlayer insulating layer 132 and the passivation layer 136 include a drain contact hole exposing the drain electrode 130, and the pixel electrode 138 is connected to the drain electrode 130 through the drain contact hole. The common electrode 134 may have a plate shape, and the pixel electrode 138 may have a shape of a bars spaced apart from each other or may have a plate shape including slits.

Although the pixel electrode 138 is formed on the common electrode 134 in the embodiment of FIGS. 4A and 4B, the common electrode may be formed on the pixel electrode in another embodiment. In another embodiment, the pixel electrode may have a plate shape, and the common electrode may have a shape of bars spaced apart from each other or may have plate shape including slits. In another embodiment, the common electrode and the pixel electrode each having a shape of bars may be formed as the same layer or as the different layers.

Further, a color filter layer may be formed under the TFT T, between the TFT T and the common electrode 134 or between the TFT T and the pixel electrode 138. The liquid crystal layer 142 is formed on the pixel electrode 138, and includes a binder 144 and liquid crystal capsules 146 dispersed in the binder 144, and each of the liquid crystal capsules 146 includes liquid crystal molecules 148.

For example, the liquid crystal layer 142 may have a thickness of about 2.5 µm to about 3.5 µm. In addition, the binder 144 may be transparent or translucent, and the binder 144 may be formed of a water soluble material, a fat soluble material or a mixed material of the water soluble material and the fat soluble material.

Further, each of the liquid crystal capsules 146 may be a polymer capsule having a diameter of about 1 nm to a value smaller than a wavelength of a visible ray. For example, each of the liquid crystal capsules 146 may include a water soluble material such as poly vinyl alcohol (PVA) or a fat soluble material such as poly methyl methacrylate (PMMA).

The liquid crystal molecules 148 may include at least one of a nematic liquid crystal molecule, a ferroelectric liquid crystal molecule and a flexo electric liquid crystal molecule. For example, a capsule diameter of each of the liquid crystal capsules 146 may be within a range of about 1 nm to about 320 nm, and a volume ratio of the liquid crystal capsules 146 to the liquid crystal layer 142 may be within a range of about 50% to about 80%. A refractive index anisotropy of each of the liquid crystal molecules 148 may be within a range of about 0.18 to about 0.30, and a dielectric anisotropy of each of the liquid crystal molecules 148 may be within a range of about 35 to about 100. In addition, as shown, a first polarizing plate 150 is formed under the substrate 120, and a second polarizing plate 152 is formed on the liquid crystal layer 142.

Figure 5:
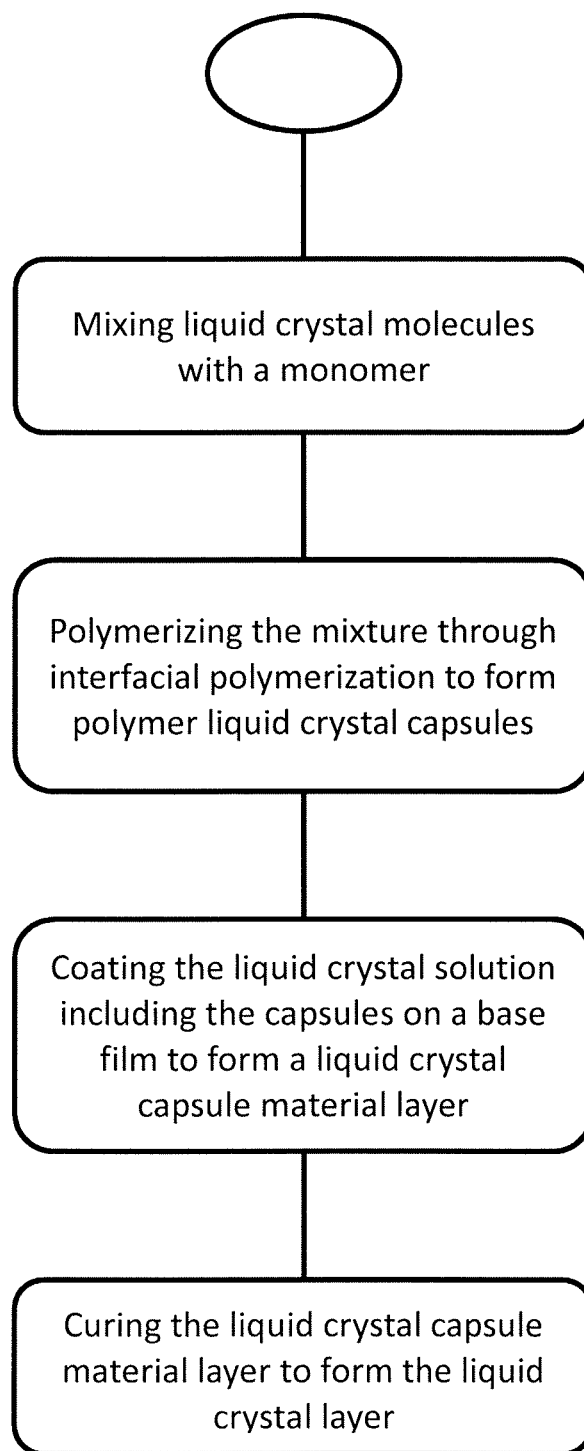
FIG. 5 is a flowchart illustrating a method of fabrication of the liquid crystal layer according to an embodiment of the present disclosure.

Next, FIG. 5 is a flowchart illustrating a method of fabrication of the liquid crystal layer according to an embodiment of the present disclosure. In fabricating the liquid crystal display device 110, the liquid crystal layer 142 including the liquid crystal capsules 146 may be formed as a film type through a coating method. The liquid crystal capsules 146 may be formed using one of a coacervation method, an in-situ polymerization method, an interfacial polymerization method and a solvent evaporation method. For example, the fat soluble liquid crystal capsule 146 may include poly methyl methacrylate (PMMA) formed through an interfacial polymerization method, and the water soluble liquid crystal capsule 146 may include poly vinyl alcohol (PVA) formed through a coacervation method. Specifically, in S501, the polymer liquid crystal capsule 146 including the liquid crystal molecule 148 therein may be formed by mixing the liquid crystal molecules 148 and a monomer and, in S502, polymerizing the monomer and the liquid crystal molecules 148 through the interfacial polymerization to form a liquid crystal solution. In S503, a liquid crystal capsule material layer is formed on a base film having the second polarizing plate 152 by coating the liquid crystal solution including the liquid crystal capsules 146 through a nozzle. In S504, the liquid crystal capsule material layer is dried or cured to form the liquid crystal layer 142 of a film type.

In addition, after the base film having the liquid crystal layer 142 and the second polarizing plate 152 is attached to the substrate having the TFT T, the common electrode 134 and the pixel electrode 138 using an adhesive layer or an adhesive, the base film is removed to complete the LCD device 110. Since the liquid crystal layer 142 is formed through a soluble process, the LCD device 110 is formed of the single substrate 120. As a result, a thickness and a weight of the LCD device 110 are reduced. Also, since the binder 144 and the liquid crystal capsules 146 are made using water soluble and/or fat soluble materials, the liquid crystal layer is made of materials that are resistant to moisture.

In a black state of FIG. 4A, a voltage is not applied (OFF) between the common electrode 134 and the pixel electrode 138, and the liquid crystal molecules 148 in each of the liquid crystal capsules 146 are randomly arranged. While a light through the first polarizing plate 150 passes through the liquid crystal layer 142, a polarization state of the light is not changed. As a result, the light is completely absorbed by the second polarizing plate 152 and the LCD device 110 displays a black.

In a white state of FIG. 4B, a voltage V is applied (ON) between the common electrode 134 and the pixel electrode 138, the liquid crystal molecules 148 in each of the liquid crystal capsules 146 are arranged along an electric field generated between the common electrode 134 and the pixel electrode 138. While a light through the first polarizing plate 150 passes through the liquid crystal layer 142, a polarization state of the light is changed. As a result, the light passes through the second polarizing plate 152 and the LCD device 110 displays a white.

In the liquid crystal layer 142, when a material of the binder 144 is different from a material of the liquid crystal capsule 146, the shell thickness ts of the liquid crystal capsule 146 may be determined by a volume ratio of the liquid crystal molecules 148 and the monomer. Accordingly, a gap distance g between the liquid crystal molecules 148 in the adjacent liquid crystal capsules 146 may be determined by a volume ratio of the monomer mixed with the liquid crystal molecules 148 and the liquid crystal molecules 148. For example, the liquid crystal capsule 146 may be formed of a water soluble material while the binder 144 may be made of a fat soluble material. When a material of the binder 144 is the same as a material of the liquid crystal capsule 146, a gap distance g between the cores 162 in the adjacent liquid crystal capsules 146 may be determined by a volume ratio of the material of the binder 144 and the liquid crystal molecules 148.

When some of the liquid crystal capsules 146 dispersed in the binder 144 are agglomerated, two liquid crystal capsules 146 are disposed to contact each other. As a result, the liquid crystal capsules 146 in the adjacent two liquid crystal capsules 146 are spaced apart from each other by the gap distance g which is twice of the shell thickness ts of the liquid crystal capsule 146.

Accordingly, when the shell thickness ts of the liquid crystal capsule 146 is formed to be equal to or greater than a half (½) of a minimum gap distance gmin for preventing the particle agglomeration by adjusting the volume ratio of the liquid crystal molecules 148 and the monomer or when the gap distance g between the cores 162 in the adjacent liquid crystal capsules 146 is formed to be equal to or greater than the minimum gap distance gmin by adjusting the volume ratio of the binder and the liquid crystal molecules 148, a scattering due to a refractive index difference between the binder 144 and the liquid crystal capsule 146 is prevented even in case of occurrence of the particle agglomeration by a non-uniform dispersion. As a result, a white spot and a black level increase are prevented and a reduction in a contrast ratio is prevented.

The prevention of the scattering due to the adjustment of the shell thickness ts of the liquid crystal capsule 146 will be illustrated hereinafter. In particular, FIG. 6 is a view showing a liquid crystal layer of the LCD device including a liquid crystal capsule in FIG. 4.

Figure 6:
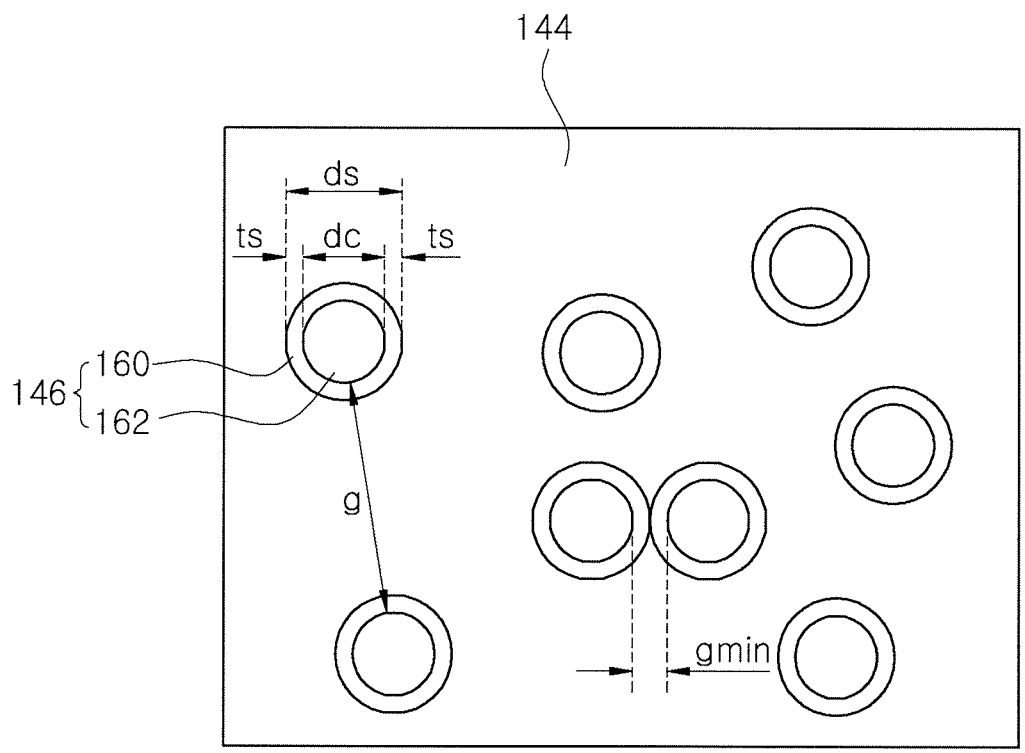
FIG. 6 is a view showing a liquid crystal layer of an LCD device including a liquid crystal capsule according to an embodiment of the present disclosure.

In FIG. 6, the liquid crystal layer 142 of the LCD device 110 includes the binder 144 and the liquid crystal capsules 146 dispersed in the binder 144. Each of the liquid crystal capsules 146 includes a shell 160 and a core 162 where the liquid crystal molecules 148 (of FIGS. 4A and 4B) are disposed. The shell includes one of poly vinyl alcohol (PVA) and poly methyl methacrylate (PMMA). In addition, each of the liquid crystal capsules 146 has a capsule diameter ds, a shell thickness ts and a core diameter dc, and the capsule diameter ds may be assumed to be a sum of twice of the shell thickness ts and the core diameter dc (ds=2ts+dc).

A gap distance g between the liquid crystal molecules 148 in the adjacent liquid crystal capsules 146 may be expressed as a distance between the cores 162 of the adjacent liquid crystal capsules 146. When two liquid crystal capsules 146 contact each other due to the particle agglomeration, the liquid crystal molecules 148 in the two liquid crystal capsules 146 are spaced apart from each other by a minimum gap distance gmin, and the minimum gap distance gmin is the same as twice of the shell thickness ts (gmin=2ts).

Accordingly, in the LCD device 110 including the liquid crystal capsule according to the embodiment of the present disclosure, the minimum gap distance gmin between the liquid crystal molecules 148 can be controlled by adjusting the shell thickness ts of the liquid crystal capsule 146 or the gap distance g between the cores 162 in the adjacent liquid crystal capsules 146. As a result, the black level of the LCD device 110 is reduced and the contrast ratio of the LCD device 110 increases by preventing the scattering and the white spot.

Further, since the scattering is prevented even when the two liquid crystal capsules 146 contact each other due to the particle agglomeration, a density of the liquid crystal capsule 146 in the liquid crystal layer 142 is maximized, and a transmittance of the liquid crystal layer 142 increases.

In addition, a range of the shell thickness ts of the liquid crystal capsule 146 or a range of the gap distance g between the liquid crystal molecules 148 in the adjacent liquid crystal capsules 146 can be determined by the minimum gap distance gmin and a volume ratio of the liquid crystal molecules 148 to the liquid crystal layer 142.

TABLE 1 shows a relation of a liquid crystal layer, a liquid crystal capsule and a liquid crystal molecule of a LCD device including a liquid crystal capsule according to an embodiment of the present disclosure.

TABLE 1

| capsule diameter (nm) | shell thickness (nm) | core diameter (nm) | liquid crystal volume ratio in capsule(%) | liquid crystal volume ratio in liquid crystal layer(%) |
|---|---|---|---|---|
| 50 | 5 | 40 | 51.2 | 34.8 |
|  | 10 | 30 | 21.6 | 14.7 |
|  | 15 | 20 | 6.4 | 4.4 |
| 100 | 5 | 90 | 72.9 | 49.6 |
|  | 10 | 80 | 51.2 | 34.8 |
|  | 15 | 70 | 34.3 | 23.3 |
|  | 20 | 60 | 21.6 | 14.7 |
|  | 30 | 40 | 6.4 | 4.4 |
|  | 40 | 20 | 0.8 | 0.5 |
| 150 | 5 | 140 | 81.3 | 55.3 |
|  | 10 | 130 | 65.1 | 44.3 |
|  | 15 | 120 | 51.2 | 34.8 |
|  | 20 | 110 | 39.4 | 26.8 |
|  | 30 | 90 | 21.6 | 14.7 |
|  | 40 | 70 | 10.2 | 6.9 |
|  | 50 | 50 | 3.7 | 2.5 |
| 200 | 5 | 190 | 85.7 | 58.3 |
|  | 10 | 180 | 72.9 | 49.6 |
|  | 15 | 170 | 61.4 | 41.8 |
|  | 20 | 160 | 51.2 | 34.8 |
|  | 30 | 140 | 34.3 | 23.3 |
|  | 40 | 120 | 21.6 | 14.7 |
|  | 50 | 100 | 12.5 | 8.5 |

In TABLE 1, when the capsule diameter ds of the liquid crystal capsule 146 is about 50 nm, about 100 nm, about 150 nm and about 200 nm, the volume ratio of the liquid crystal molecules 148 with respect to the liquid crystal layer 142 (a liquid crystal volume ratio in a liquid crystal layer) can be controlled by adjusting the shell thickness ts, the core diameter dc, the volume ratio of the liquid crystal molecules 148 with respect to the liquid crystal capsule 146 (a liquid crystal volume ratio in a capsule) and the volume ratio of the liquid crystal capsule 146 with respect to the liquid crystal layer 142.

Since the scattering is prevented even when two liquid crystal capsules 146 contact each other due to the particle agglomeration, the volume ratio of the liquid crystal capsule 146 with respect to the liquid crystal layer 142 may reflect about 68% of a packing density of a body centered cubic (BCC).

When the minimum gap distance gmin between the liquid crystal molecules 148 for preventing the scattering is determined as about 20 nm, the shell thickness ts of the liquid crystal capsule 146 may be formed to be equal to or greater than about 10 nm, or the gap distance g between the liquid crystal molecules 148 in the liquid crystal capsule 146 may be formed to be equal to or greater than about 20 nm. As a result, the scattering and the white spot are prevented, the black level of the minimum transmittance is reduced, and the contrast ratio increases.

When the LCD device 110 has the white level of the maximum transmittance equal to or greater than about 80%, a reduction in a display quality of an image may be prevented. When the liquid crystal volume ratio in the liquid crystal layer is equal to or greater than about 20%, the white level equal to or greater than about 80% may be obtained.

As a result, for improving the black level and the contrast ratio of the LCD device 110, the shell thickness ts of the liquid crystal capsule 146 is formed to be equal to or greater than about 10 nm, or the gap distance g between the liquid crystal molecules 148 in the adjacent liquid crystal capsules 146 is formed to be equal to or greater than about 20 nm. In addition, for improving the transmittance and the display quality of the LCD device 110, the liquid crystal volume ratio in the liquid crystal layer is formed to be equal to or greater than about 20%.

Here, the liquid crystal volume ratio of the liquid crystal layer may be determined by the capsule diameter ds, the shell thickness ts, the core diameter dc and the liquid crystal volume ratio in the capsule.

Accordingly, a lower limit of the shell thickness ts of the liquid crystal capsule 146 may be determined as about 10 nm based on an improvement of the black level and the contrast ratio, and an upper limit of the shell thickness ts of the liquid crystal capsule 146 may be determined as about 0.15 times (3/20) of the capsule diameter ds based on an improvement of the transmittance and the display quality.

Alternatively, a lower limit of the gap distance g between the liquid crystal molecules 148 in the adjacent liquid crystal capsules 146 may be determined as about 20 nm based on an improvement of the black level and the contrast ratio, and an upper limit of the gap distance g between the liquid crystal molecules 148 in the adjacent liquid crystal capsules 146 may be determined as about 0.3 times (3/10) of the capsule diameter ds based on an improvement of the transmittance and the display quality.

For example, when the capsule diameter ds of the liquid crystal capsule 146 is about 50 nm, the liquid crystal volume ratio in the liquid crystal layer is equal to or greater than about 20% in case of the shell thickness ts of about 5 nm. As a result, for the improvement of the black level, the contrast ratio, the transmittance and the display quality, the shell thickness ts may be determined within a range equal to or smaller than about 5 nm of about 0.1 times (1/10) of the capsule diameter ds, or the gap distance g between the liquid crystal molecules 148 in the adjacent liquid crystal capsules 146 may be determined within a range equal to or smaller than about 10 nm of about 0.2 times (1/5) of the capsule diameter ds.

When the capsule diameter ds of the liquid crystal capsule 146 is about 100 nm, the liquid crystal volume ratio in the liquid crystal layer is equal to or greater than about 20% in case of the shell thickness ts of about 5 nm, about 10 nm and about 15 nm. As a result, for the improvement of the black level, the contrast ratio, the transmittance and the display quality, the shell thickness ts may be determined within a range equal to or greater than about 10 nm and equal to or smaller than about 15 nm of about 0.15 times (3/20) of the capsule diameter ds, or the gap distance g between the liquid crystal molecules 148 in the adjacent liquid crystal capsules 146 may be determined within a range equal to or smaller than about 20 nm of about 0.3 times (3/10) of the capsule diameter ds.

When the capsule diameter ds of the liquid crystal capsule 146 is about 150 nm, the liquid crystal volume ratio in the liquid crystal layer is equal to or greater than about 20% in case of the shell thickness ts of about 5 nm, about 10 nm, about 15 nm and about 20 nm. As a result, for the improvement of the black level, the contrast ratio, the transmittance and the display quality, the shell thickness ts may be determined within a range equal to or greater than about 10 nm and equal to or smaller than about 20 nm of about 0.13 times (2/15) of the capsule diameter ds, or the gap distance g between the liquid crystal molecules 148 in the adjacent liquid crystal capsules 146 may be determined within a range equal to or smaller than about 40 nm of about 0.26 times (4/15) of the capsule diameter ds.

When the capsule diameter ds of the liquid crystal capsule 146 is about 200 nm, the liquid crystal volume ratio in the liquid crystal layer is equal to or greater than about 20% in case of the shell thickness ts of about 5 nm, about 10 nm, about 15 nm, about 20 nm and about 30 nm. As a result, for the improvement of the black level, the contrast ratio, the transmittance and the display quality, the shell thickness ts may be determined within a range equal to or greater than about 10 nm and equal to or smaller than about 30 nm of about 0.15 times (3/20) of the capsule diameter ds, or the gap distance g between the liquid crystal molecules 148 in the adjacent liquid crystal capsules 146 may be determined within a range equal to or smaller than about 60 nm of about 0.3 times (3/10) of the capsule diameter ds.

Accordingly, in the LCD device 110 including the liquid crystal capsule according to the embodiment of the present disclosure, the shell thickness ts of the liquid crystal capsule 146 can be formed within a range equal to or greater than about 10 nm and equal to or smaller than about 0.15 times (3/20) of the capsule diameter ds, or the gap distance g between the liquid crystal molecules 148 in the adjacent liquid crystal capsules 146 can be formed within a range equal to or greater than about 20 nm and equal to or smaller than about 0.3 times (3/10) of the capsule diameter ds. As a result, the black level and the contrast ratio are improved and the transmittance and the display quality are improved.

When the shell thickness ts is smaller than about 10 nm or the gap distance g between the liquid crystal molecules 148 in the adjacent liquid crystal capsules 146 is smaller than about 20 nm, the black level increases and the contrast ratio decreases due to the scattering. When the shell thickness ts is greater than about 0.15 times (3/20) of the capsule diameter ds or the gap distance g between the liquid crystal molecules 148 in the adjacent liquid crystal capsules 146 is greater than about 0.3 times (3/10) of the capsule diameter ds, the transmittance decreases and the display quality is deteriorated due to a deficiency of the liquid crystal molecule.

For example, the capsule diameter ds can be formed within a range of about 50 nm to about 200 nm. Further, the shell thickness ts can be formed within a range of about 10 nm to about 30 nm, or the gap distance between the liquid crystal molecules 148 in the adjacent liquid crystal capsules 146 can be formed within a range of about 20 nm to about 60 nm. The liquid crystal volume ratio in the liquid crystal layer can be formed within a range of about 20% to about 50%.

The relation of the transmittance and the voltage of the LCD device 110 according to the embodiment will be illustrated hereinafter. In particular, FIGS. 7A and 7B are views showing a transmittance-voltage (TV) curve of an LCD device including a liquid crystal capsule according to an embodiment of the present disclosure.

Figure 7A:
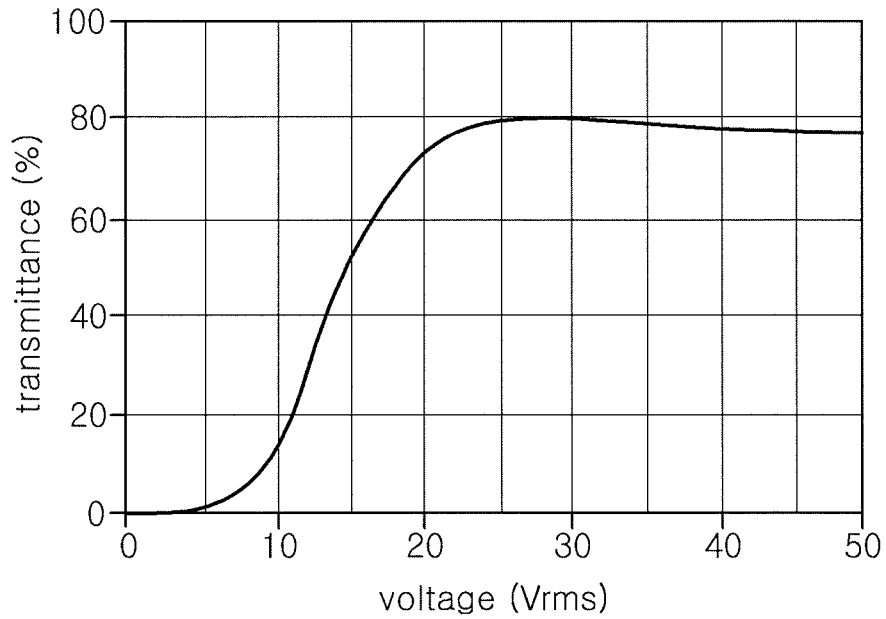
FIGS. 7A and 7B are views showing a transmittance-voltage (TV) curve of an LCD device including a liquid crystal capsule according to an embodiment of the present disclosure.

In the LCD device 110 of a first sample of FIG. 7A, a thickness of the liquid crystal layer 142 is about 3.1 μm, and the liquid crystal capsule 146 is formed of poly vinyl alcohol (PVA). The shell thickness ts of the liquid crystal capsule 146 is within a range of about 10 nm to about 15 nm, or the gap distance g between the liquid crystal molecules 148 in the adjacent liquid crystal capsules 146 is within a range of about 20 nm to about 30 nm. The capsule diameter ds of the liquid crystal capsule 146 is within a range of about 100 nm to about 200 nm, and a volume ratio of the liquid crystal molecule 148 with respect to the liquid crystal layer 142 is about 37%. Since the LCD device 110 of the first sample has the excellent white level of a maximum transmittance of about 80% and the excellent black level of a minimum transmittance of about 0.29%, the black level and the contrast ratio are improved and the transmittance and the display quality are improved.

Figure 7B:
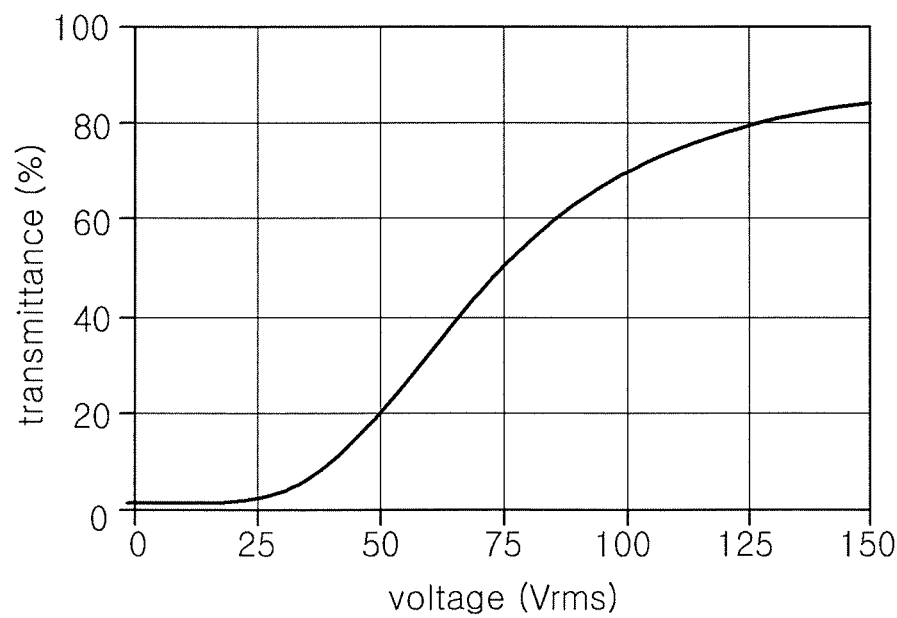

In the LCD device 110 of a second sample of FIG. 7B, a thickness of the liquid crystal layer 142 is about 3.2 μm, and the liquid crystal capsule 146 is formed of poly methyl methacrylate (PMMA). The shell thickness is of the liquid crystal capsule 146 is within a range of about 10 nm to about 20 nm, or the gap distance g between the liquid crystal molecules 148 in the adjacent liquid crystal capsules 146 is within a range of about 20 nm to about 40 nm. The capsule diameter ds of the liquid crystal capsule 146 is within a range of about 100 nm to about 200 nm, and a volume ratio of the liquid crystal molecules 148 with respect to the liquid crystal layer 142 is about 32%. Since the LCD device 110 of the second sample has the excellent white level of a maximum transmittance of about 85% and the excellent black level of a minimum transmittance of about 0.4%, the black level and the contrast ratio are improved and the transmittance and the display quality are improved.

Consequently, in the LCD device including the liquid crystal capsule according to the embodiment of the present disclosure, since the shell thickness of the liquid crystal capsule is formed within a range equal to or greater than about the half (½) of the minimum gap distance for preventing the scattering and equal to or smaller than about 0.15 times (3/20) of the capsule diameter for preventing the decrease of the transmittance, or the gap distance between the liquid crystal molecules in the adjacent liquid crystal capsules is formed within a range equal to or greater than the minimum gap distance for preventing the scattering and equal to smaller than about 0.3 (3/10) of the capsule diameter for preventing the decrease of the transmittance. As a result, the black level is reduced and the contrast ratio increases by preventing the particle agglomeration and the white spot regardless of the dispersion degree of the liquid crystal capsule. Further, since the scattering is prevented even in case of the particle agglomeration, the density of the liquid crystal capsule is maximized and the display quality is improved.

It will be apparent to those skilled in the art that various modifications and variations can be made in a LCD device including a liquid crystal capsule and a method of fabricating the same of the present disclosure without departing from the sprit or scope of the disclosure. Thus, it is intended that the present disclosure covers the modifications and variations of these aspects provided they come within the scope of the appended claims and their equivalents.

What is claimed is:

1. A liquid crystal solution, comprising:
a plurality of liquid crystal capsules including at least one pair of liquid crystal capsules in direct contact with each other,
wherein each of the plurality of liquid crystal capsules includes a shell and a core having a plurality of liquid crystal molecules therein,
wherein a gap distance between the liquid crystal molecules in adjacent liquid crystal capsules is equal to or greater than 20 nm and equal to or smaller than 0.3 times of a capsule diameter of the adjacent liquid crystal capsules,
wherein a shell thickness of each liquid crystal capsule among the at least one pair of liquid crystal capsules is equal to or greater than 10 nm and equal to or smaller than 0.15 times of a capsule diameter of each liquid crystal capsule among the at least one pair of liquid crystal capsules,
wherein a maximum length of the at least one pair of liquid crystal capsules is greater than or equal to 90 nm and equal to or smaller than 240 nm,
wherein a refractive index of each of the plurality of liquid crystal molecules is within a range of 0.18 to 0.30, and a dielectric anisotropy of each of the plurality of liquid crystal molecules is within a range of 35 to 100,
wherein the plurality of liquid crystal capsules include at least two overlapping layers of liquid crystal capsules dispersed within the liquid crystal solution, and
wherein the liquid crystal solution has a peak transmittance that flattens between 20 volts and 30 volts, and decreases by at least 1% or more from 30 volts to 50 volts.

2. The liquid crystal solution of claim 1, wherein the capsule diameter is within a range of 50 nm to 200 nm.

3. The liquid crystal solution of claim 2, wherein a shell thickness of the shell is equal to or greater than 10 nm and equal to or smaller than 0.15 times of the capsule diameter.

4. The liquid crystal solution of claim 1, wherein a volume ratio of the plurality of liquid crystal molecules with respect to the liquid crystal solution is within a range of 20% to 50%.

5. The liquid crystal solution of claim 1, further comprising a binder, wherein the plurality of liquid crystal capsules are dispersed in the binder,
wherein the binder surrounding the plurality of liquid crystal capsules includes one of a water soluble material, a fat soluble material and a mixed material of the water soluble material and the fat soluble material, and the binder has one of a transparency and a translucence.

6. The liquid crystal solution of claim 5, wherein the material of the binder is different from a material of the liquid crystal capsule.

7. The liquid crystal solution of claim 5, wherein the material of the binder is the same as the material of the liquid crystal capsule.

8. The liquid crystal solution of claim 1, further comprising a binder, wherein the plurality of liquid crystal capsules are dispersed in the binder,
wherein the binder surrounding the plurality of liquid crystal capsules includes a fat soluble material.

9. The liquid crystal solution of claim 8, wherein the gap distance between the liquid crystal molecules in the adjacent liquid crystal capsules is determined by one of a volume ratio of the binder and the plurality of liquid crystal molecules and a volume ratio of a monomer and the plurality of liquid crystal molecules.

10. The liquid crystal solution of claim 1, wherein a volume ratio of the plurality of liquid crystal molecules with respect to the liquid crystal solution is approximately 37% and the plurality of liquid crystal capsules are formed of poly vinyl alcohol.

11. A liquid crystal solution, comprising:
a plurality of liquid crystal capsules including at least one pair of liquid crystal capsules in direct contact with each other,
wherein each of the plurality of liquid crystal capsules includes a shell and a core having a plurality of liquid crystal molecules therein,
wherein a gap distance between the liquid crystal molecules in the at least one pair of liquid crystal capsules is equal to or greater than 20 nm and equal to or smaller than 0.3 times of a capsule diameter of each liquid crystal capsule among the at least one pair of liquid crystal capsules,
wherein a shell thickness of each liquid crystal capsule among the at least one pair of liquid crystal capsules is equal to or greater than 10 nm and equal to or smaller than 0.15 times of the capsule diameter of each liquid crystal capsule among the at least one pair of liquid crystal capsules,
wherein a maximum length of the at least one pair of liquid crystal capsules is greater than or equal to 90 nm and equal to or smaller than 240 nm,
wherein a shell of the plurality of liquid crystal capsules has a thickness within a range equal to or greater than 10 nm and equal to or smaller than 15 nm when a capsule diameter of the shell is 100 nm, the shell of the plurality of liquid crystal capsules has a thickness within a range equal to or greater than 10 nm and equal to or smaller than 20 nm when the capsule diameter of the shell is 150 nm, and the shell of the plurality of liquid crystal capsules has a thickness within a range equal to or greater than 10 nm and equal to or smaller than 30 nm when the capsule diameter of the shell is 200 nm, and
wherein the liquid crystal solution has a peak transmittance that flattens between 20 volts and 30 volts, and decreases by at least 1% or more from 30 volts to 50 volts.

* * * * *